United States Patent
Baillargeon

(10) Patent No.: US 9,602,383 B2
(45) Date of Patent: Mar. 21, 2017

(54) GENERAL PACKET RADIO SERVICE TUNNEL PERFORMANCE MONITORING

(71) Applicant: Telefonaktiebolaget L M Ericsson (Publ), Stockholm (SE)

(72) Inventor: Steve Baillargeon, Gattineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 13/902,162

(22) Filed: May 24, 2013

(65) Prior Publication Data

US 2014/0105044 A1 Apr. 17, 2014

Related U.S. Application Data

(60) Provisional application No. 61/712,505, filed on Oct. 11, 2012.

(51) Int. Cl.
*H04L 12/26* (2006.01)
*H04W 24/08* (2009.01)

(52) U.S. Cl.
CPC ............ *H04L 43/50* (2013.01); *H04L 43/087* (2013.01); *H04L 43/0835* (2013.01); *H04L 43/0847* (2013.01); *H04L 43/0858* (2013.01); *H04W 24/08* (2013.01)

(58) Field of Classification Search
CPC ............. H04L 43/0829; H04L 43/0835; H04L 43/0852; H04L 43/0858; H04L 4/10; H04L 4/1063; H04W 24/06; H04W 24/08
See application file for complete search history.

(56) References Cited

U.S. PATENT DOCUMENTS

| | | | |
|---|---|---|---|
| 6,928,473 B1* | 8/2005 | Sundaram et al. | 709/224 |
| 7,457,868 B1* | 11/2008 | Guo | 709/224 |
| 7,835,290 B2* | 11/2010 | Song et al. | 370/241.1 |
| 2003/0023710 A1* | 1/2003 | Corlett et al. | 709/223 |
| 2003/0108033 A1 | 6/2003 | Raisanen et al. | |
| 2004/0208165 A1* | 10/2004 | Cai et al. | 370/352 |

(Continued)

OTHER PUBLICATIONS

Y. Shi et al.—Internet Engineering Task Force (IETF) (Request for Comments (RFC) 5833), Category: Informational, "Control and Provisioning of Wireless Access Points (CAPWAP) Protocol Base MIB", ISSN: 2070-1721, (May 2010) consisting of 73-pages.

(Continued)

*Primary Examiner* — Anh-Vu Ly
*Assistant Examiner* — Hector Reyes Ortiz
(74) *Attorney, Agent, or Firm* — Christopher & Weisberg, P.A.

(57) ABSTRACT

Arrangements include methods and systems for enabling collection of end to end performance information of individual tunnels in a GPRS. According to one aspect, a GTP-U sender node is configured to provide to a GTP-U receiver node a sequence number for a G-PDU to enable determination of a first set of one-way performance data of a GTP-U tunnel to be monitored. The GTP-U sender node may further be configured to provide an exit timestamp for a G-PDU to enable determination of a second set of one-way performance data of the GTP-U tunnel to be monitored. Either one or both of the sender node and the receiver node may send G-PDU performance monitor records to a GTP-U performance monitor collector.

24 Claims, 10 Drawing Sheets

(56) References Cited

U.S. PATENT DOCUMENTS

| | | |
|---|---|---|
| 2007/0064673 A1 | 3/2007 | Bhandaru et al. |
| 2008/0037548 A1* | 2/2008 | Yi et al. ................. 370/394 |
| 2008/0076419 A1* | 3/2008 | Khetawat et al. ......... 455/435.1 |
| 2008/0095068 A1* | 4/2008 | Uysal ..................... 370/252 |
| 2008/0170521 A1* | 7/2008 | Govindan et al. ........... 370/310 |
| 2009/0141694 A1 | 6/2009 | Shi |
| 2010/0118724 A1* | 5/2010 | Hirsch et al. ............. 370/252 |
| 2010/0128770 A1* | 5/2010 | Stanciu .................. 375/228 |
| 2010/0211675 A1* | 8/2010 | Ainali et al. ............. 709/224 |
| 2010/0226278 A1* | 9/2010 | Borsos et al. ............ 370/253 |
| 2011/0063988 A1* | 3/2011 | Lee et al. ............... 370/252 |
| 2012/0026869 A1* | 2/2012 | Wang et al. ............. 370/230 |
| 2012/0087235 A1* | 4/2012 | Smith ............... H04L 41/0677 370/221 |
| 2012/0122501 A1 | 5/2012 | Lai |

OTHER PUBLICATIONS

P. Calhoun et al.—Network Working Group (Request for Comments (RFC) 5415), Category: Standards Track, "Control and Provisioning of Wireless Acess Points (CAPWAP) Protocol Specification", (Mar. 2009) consisting of 155-pages.

K. Hedayat et al.—Network Working Group (Request for Comments (RFC) 5357), Category: Standards Track, "A Two-Way Active Measurement Protocol (TWAMP)", (Oct. 2008) consisting of 26-pages.

E. Rescorla et al.—Network Working Group (Request for Comments (RFC) 4347), Category: Standards Track, "Datagram Transport Layer Security", (Apr. 2006) consisting of 25-pages.

H. Schulzrinne et al.—Network Working Group (Request for Comments (RFC) 3550), Obsoletes: 1889, Category: Standards Track, "RTP: A Transport Protocol for Real-Time Applications", (Jul. 2003) consisting of 89-pages.

RTP Control Protocol dated Jun. 23, 2013, Retrieved from the Internet:< URL: http://en.wikipedia.org/wiki/RTCP> consisting of 4-pages.

Sadasivan et al. Network Working Group #rfc 5470 "Architecture for IP Flow Information Export", (Mar. 2009) consisting of 31-pages.

Shalunov et al.—Network Working Group #rfc4656 "A One-way Active Measurement Protocol (OWAMP)", (Sep. 2006) consisting of 56-pages.

3GPP TS 29.281 V11.5.0 3rd Generation Partnership Project; Technical Specification Group Core Network and Terminals; General Packet Radio System (GPRS) Tunnelling Protocol User Plane (GTPv1-U) (Release 11) (Dec. 2012) consisting of 27-pages.

3GPP TS 36.413 V11.2.1 (Feb. 2013) 3rd Generation Partnership Project; Technical Specification Group Radio Access Network; Evolved Universal Terrestrial Radio Access Network (E-UTRAN); S1 Application Protocol (S1AP) (Release 11) (Feb. 2013) consisting of 272-pages.

3GPP TS 36.423 V11.3.0 (Dec. 2012) 3rd Generation Partnership Project; Technical Specification Group Radio Access Network; Evolved Universal Terrestrial Radio Access Network (E-UTRAN); X2 application protocol (X2AP) (Release 11) (Dec. 2012) consisting of 141-pages.

Networking Group (Request for Comments (RFC) 1305) "Network Time Protocol (Version 3) Specification, Implementation and Analysis", (Mar. 1992) consisting of 120-pages.

International Search Report and Written Opinion dated Feb. 10, 2014 for International Application No. PCT/IB2013/058442, International Filing Date: Sep. 10, 2013 consisting of 10-pages.

NPL: Bernaschi et al.: "OpenCAPWAP: An open source CAPWAP implementation for the management and configuration of WiFi hot spots", Computer Networks, Elsevier Science Publishers B.V., Amsterdam, NL, vol. 53, No. 2, Feb. 13, 2009 (Feb. 13, 2009), pp. 217-230, XP025846109, ISSN: 1389-1286, DOI: 10.1016/J. Comnet.2008.09.016 [retrieved on Oct. 4, 2008] p. 2, col. 1, p. 6, paragraph 5-p. 11, figures 1, 4, 5, 7 and 11 consisting of 14-pages.

1st Non-Final Office Action dated Oct. 14, 2015 U.S. Appl. No. 14/017,950, filed Sep. 4, 2013 consisting of 24 pages.

\* cited by examiner

GENERAL PACKET RADIO SERVICE TUNNEL PERFORMANCE MONITORING

CROSS-REFERENCE TO RELATED APPLICATION

This application is related to and claims priority to U.S. Provisional Patent Application Ser. No. 61/712,505, filed Oct. 11, 2012, entitled METHOD AND SYSTEM FOR GTP-U TUNNEL PERFORMANCE MONITORING, the entirety of which is incorporated herein by reference.

TECHNICAL FIELD

The present invention relates generally to a general packet radio system, GPRS, tunneling protocol user (GTP-U) tunnel performance monitoring and more particularly to monitoring the end-to-end performance of a GTP-U tunnel over an Internet protocol (IP) network.

BACKGROUND

The general packet radio service (GPRS) is a packet oriented mobile data service for cellular communications systems, such as the global system for mobile communications (GSM), wideband code division multiple access (WCDMA), long term evolution (LTE) and wireless local area network (WLAN). A general packet radio system (GPRS) tunneling protocol user (GTP-U) node supports one or more GTP-U endpoints. Each pair of GTP-U endpoints is known as a GTP-U path which carries multiple GTP-U tunnels. GTP-U tunnels carry GTP-U data packets (also known as G-PDUs) between a pair of GTP-U tunnel endpoints. A tunnel endpoint is identified by a tunnel identifier, e.g., tunnel endpoint identifier (TEID).

A TEID identifies a unicast or multicast GTP-U tunnel endpoint in the receiving GTP-U node for a given GTP-U endpoint. The TEID is included in the GTP header of the G-PDU. The receiving end of a unicast GPRS tunneling protocol, GTP, tunnel assigns the TEID value that the transmitting end should use. The transmitting end of a multicast GTP tunnel assigns the TEID value the receiving end should use. The TEID values are exchanged between tunnel endpoints using control plane messaging.

The control plane procedures to setup a GTP-U tunnel are defined in protocols such as GTP-C, Radio Access Network Application Part (RANAP), S1-Application Protocol (S1-AP), X2 Application Protocol (X2-AP) and M3 Application Protocol (M3AP).

FIGS. 1 and 2 show a known GPRS 10 which includes three GTP-U nodes 12a, 12b and 12c (referred to collectively herein as "GTP-U nodes 12") that are connected by an Internet Protocol (IP) network 18. Each GTP-U node acts as a sender and a receiver of G-PDUs. FIG. 1 shows a unicast G-PDU being sent between GTP-U nodes 12c and 12a. FIG. 2 shows the same known GPRS 10 with the three GTP-U nodes 12a, 12b and 12c connected by the Internet network 18. In FIG. 2, a multicast G-PDU is being sent from GTP-U node 12a to GTP-U node 12b and to GTP-U node 12c.

Active IP probe based sampling of the IP path carrying the GTP-U tunneled traffic is currently used as a methodology for estimating the end-to-end state and performance of the unicast subscriber connection across the IP network. However, active IP probe based sampling does not measure the actual packet delay, packet delay variation and packet loss encountered by the user traffic carried on unicast GTP-U tunnels. The same problem exists for multicast GTP-U tunnels. Active IP probe based sampling, like the One-Way Active Measurement Protocol (OWAMP) and Two-Way Active Measurement Protocol (TWAMP), only provide a rough estimate of the performance perceived by the aggregated set of GTP-U tunnels on a given path.

The Internet engineering task force (IETF) standard body has defined an IP flow information export (IPFIX) architecture and protocol for selective monitoring of IP flows passing through an observation point and the export of measured IP flow information. IPFIX does not address the selective monitoring of GTP-U tunnels. IP flow information export does not provide the required granularity and depth of information to properly monitor the performance of a specific GTP-U tunnel. Furthermore, IPFIX is not designed to provide path performance statistics like end-to-end packet delay and packet loss. Such statistics are useful for characterizing tunnel performance.

SUMMARY

Methods and systems for enabling collection of end to end performance information of individual tunnels in a GPRS are disclosed. According to one aspect, a GTP-U sender node is configured to provide a sequence number for a G-PDU to enable determination of a first set of one-way performance data of a GTP-U tunnel to be monitored.

According to this aspect, the GTP-U sender node may further be configured to provide an exit timestamp for a G-PDU to enable determination of a second set of one-way performance data of the GTP-U tunnel to be monitored. The second set of one-way performance data may include at least one of one-way packet delay and packet delay variation statistics. The first set of one-way performance data may include at least one of one-way packet loss, packet misordering, and packet duplicate statistics. In one embodiment, the GTP-U sender node is further configured to initiate a sequence counter to assign a sequence number to each outgoing G-PDU for the tunnel to be monitored. The sequence number intended for performance monitoring may be included in a GTP-U header. In one embodiment, the exit time stamp intended for performance monitoring is included in one of the GTP-U header and a GTP-U extension header. In one embodiment, the system further includes a GTP-U performance monitor collector in communication with the GTP-U sender node. The GTP-U performance monitor collector is configured to collect performance monitoring data from the GTP-U sender node. The performance monitoring data may include the sequence number and the exit timestamp of the G-PDU. In some embodiments, the GTP-U sender node is further configured to activate tunnel monitoring by sending a request message to a GTP-U receiver node. The request message includes and identifies a tunnel endpoint identifier of the GTP-U tunneled to be monitored. The presence of the tunnel endpoint identifier in the request message indicates that the identified tunnel is to be monitored. In this embodiment, the request message originates from a control node responsible for at least one of signaling, trace and network management functions. The request message may further include at least one of a subscriber reference identifier, packet loss threshold, and initial sequence number, last sequence number, the number of packets to monitor, diffserv code point, priority code point, initial time to live, and a performance monitoring collection method. The GTP-U sender node may further be configured to receive a response message from the GTP-U receiver node at an end of the GTP-U tunnel to be monitored. The control node may be further configured to receive a response message from the GTP-U receiver node at an end of the GTP-U tunneled to be monitored. In one embodiment, the GTP-U sender node is further configured to activate tunnel monitoring in one of a control mode and a data mode. In the control mode, the GTP-U sender node is further configured to exchange control messages with the GTP-U receiver node at an end of the GTP-U tunnel to be monitored. In the data mode, the GTP-U sender node is further configured to signal a start of performance monitoring by including at least one of the sequence number and a timestamp in the G-PDU. Further, in the data mode, the GTP-U sender node is further configured to signal a termination of performance monitoring by no longer including the at least one of the sequence number and the timestamp in a G-PDU. In some embodiments, a GTP-U receiver node is configured to receive the sequence number and the exit timestamp at the G-PDU and to compute an arrival timestamp indicating arrival of the G-PDU.

According to another aspect, the invention provides a system for enabling collection of end-to-end performance information for individual GPRS user tunnels established between GTP-U nodes. The system comprises a GTP-U receiver node configured to receive a sequence number in a G-PDU. According to this aspect, in one embodiment, the GTP-U receiver node is further configured to receive an exit timestamp, and to assign an arrival timestamp to each received G-PDU. In one embodiment, the GTP-U receiver node is further configured to trigger a notification of performance degradation based on a statistical analysis of the collected performance monitoring, PM, data. In one embodiment, the GTP-U receiver node is further configured to receive a request message from one of the GTP-U sender node signaling node, a trace node and a network management node. The request message includes a tunnel endpoint identifier of the GTP-U tunnel to be monitored, and indicates that the identified GTP-U tunnel is to be monitored. The tunnel monitoring request message can be included in a connection setup message. In one embodiment, the GTP-U performance monitor collector is in communication with the GTP-U receiver node. The GTP-U performance monitor collector is configured to collect performance monitoring data from the GTP-U receiver node. The performance monitoring data includes the sequence number, an exit timestamp and an arrival timestamp. In this embodiment, the GTP-U performance monitor collector is further configured to process data received from the GTP-U receiver node concerning performance of a GTP-U tunnel being monitored. The data includes one of one-way packet delay, one-way packet delay variation, one-way packet loss, one-way packet misordering, and one-way packet duplicate statistics produced by the GTP-U receiver node. The GTP-U performance monitor collector may further be configured to trigger a notification of performance degradation based on a statistical analysis of the collective performance monitoring data.

According to still another aspect, the invention provides a method of collecting end-to-end performance data for GTP-U tunnels established between GTP-U nodes. The method includes receiving at a GTP-U receiver unit at least one G-PDU having an exit timestamp and a sequence number placed in a header by a GTP-U sender unit. An arrival timestamp is assigned to each of the at least one G-PDU. At least one statistical metric concerning the at least one G-PDU is determined based on at least one of the exit timestamp, the sequence number and the arrival timestamp. According to this aspect, in one embodiment, the at least one statistical metric includes at least one of the sequence number of the first received G-PDU, a sequence number of a last received G-PDU, an arrival timestamp of the first received G-PDU, an arrival timestamp of the last received G-PDU, and a number of received G-PDUs.

In accordance with still another aspect, the invention provides a system for enabling collection of end-to-end performance information for Control and Provisioning of Wireless Access Points, CAPWAP, protocol data channels established between CAPWAP nodes. In accordance with this aspect, a CAPWAP data sender is configured to provide a sequence number for a CAPWAP data packet to enable determination of a first set of one-way performance data of a CAPWAP data channel to be monitored. According to this aspect, in one embodiment, the CAPWAP data sender is further configured to provide an exit time stamp for a CAPWAP data packet to enable determination of a second set of one-way performance data of a CAPWAP data channel to be monitored.

DETAILED DESCRIPTION

Figure 1:
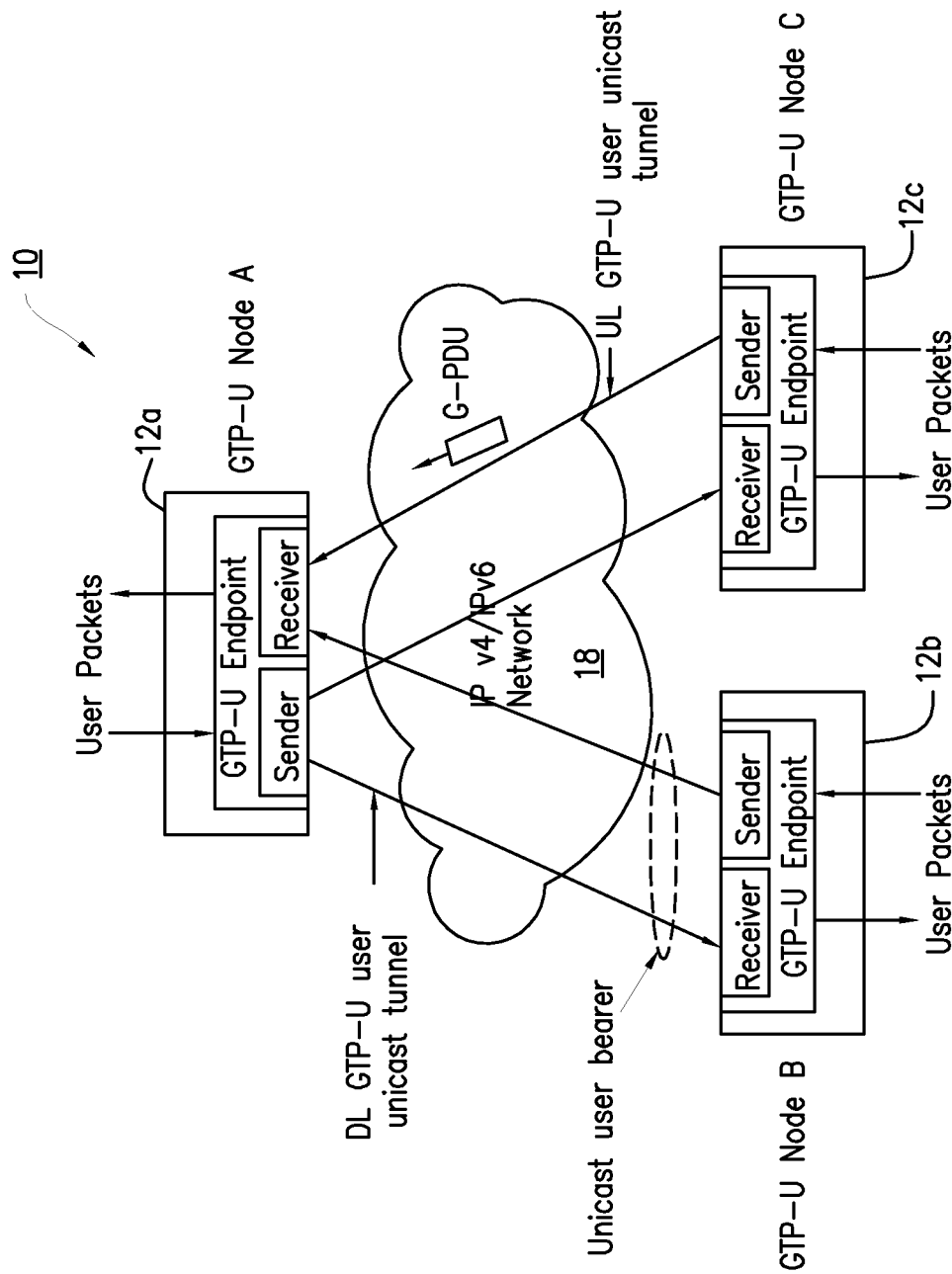
FIG. 1 is a diagram of a known network employing unicast communication between GTP-U endpoints.
Figure 2:
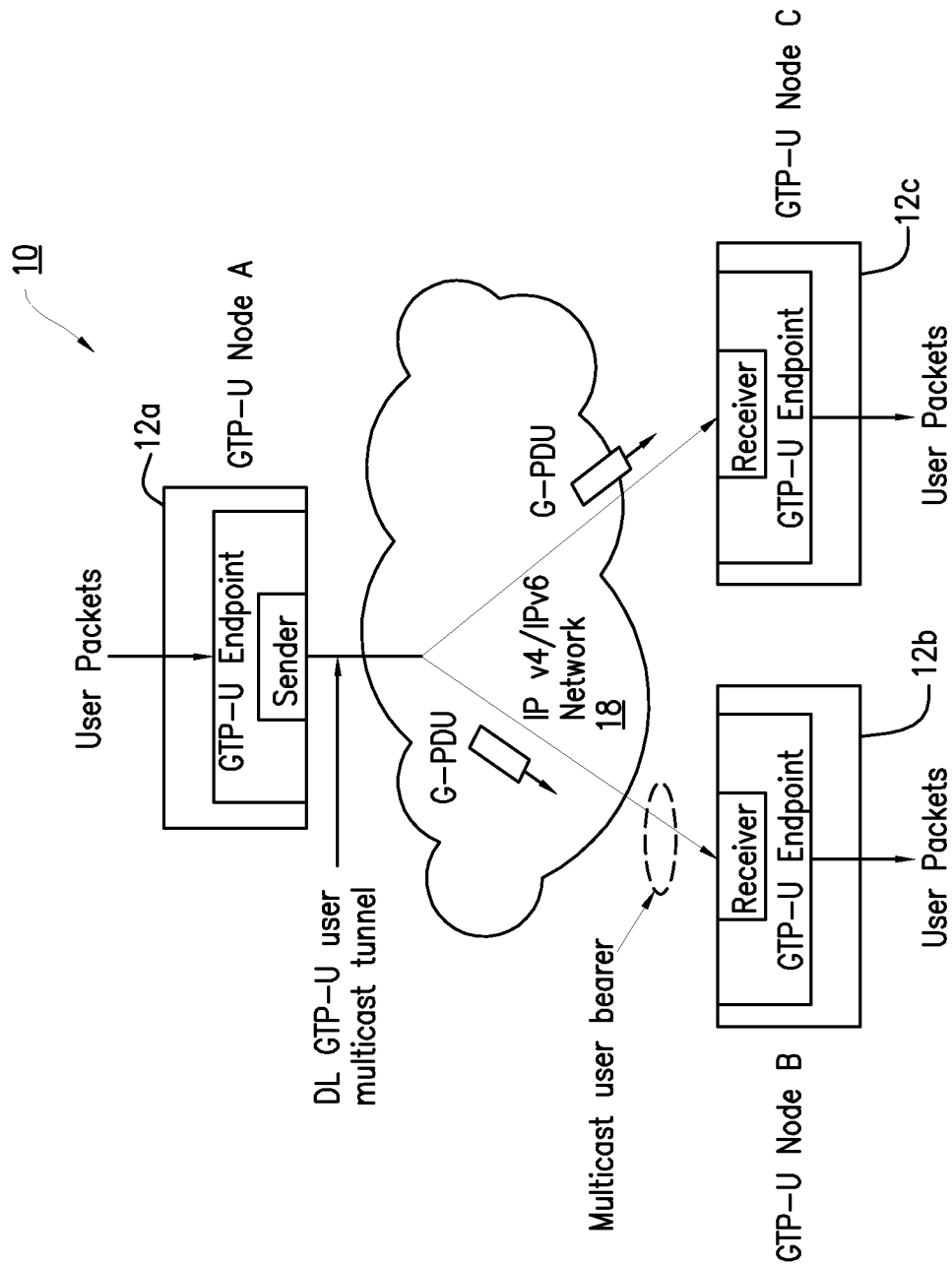
FIG. 2 is a diagram of a known network employing multicast communication between GTP-U end points.

Before describing in detail exemplary embodiments that are in accordance with the present invention, it is noted that the embodiments reside primarily in combinations of apparatus components and processing steps related to monitor tunnels in an IP network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein illustrate a method and system for enabling collection of end-to-end performance information for individual GTP-U tunnels established between GTP-U nodes in mobile networks for administrative, troubleshooting, quality-of-service (QoS) monitoring, user traffic profiling, attack/intrusion detection, and planning purposes. A GTP-U sender provides a sequence number and an exit timestamp for the purpose of monitoring the end-to-end performance of a unicast or multicast GTP-U tunnel. A GTP-U receiver provides an arrival timestamp and collects G-PDU performance data including outer G-PDU information, e.g. outer IP and Ethernet header fields, and inner G-PDU information, e.g. inner IP, ICMP, TCP, UDP and SCTP header fields. Also described is a method to transfer the G-PDU performance data to a performance data collector responsible for collecting, correlating, calculating and reporting the performance metrics of the end-to-end GTP-U tunnel or end-to-end user connection.

Embodiments allow each GTP-U tunnel to be monitored individually. The operator may decide to monitor the downlink direction of a specific unicast or multicast user bearer or may decide to monitor both directions of a unicast user bearer at the same time. The flexibility to monitor each individual GTP-U tunnel allows defining a performance monitoring (PM) solution applicable for both unicast and multicast bearers. It also allows controlling the GTP-U transmission overhead, GTP-U endpoint processing overhead and volume of GTP-U performance data.

The following acronyms are used herein:
AC Access Controller
DL Downlink
DSCP Diffserv Codepoint
ECN Explicit Congestion Notification
eNB E-UTRAN Node B
GGSN Gateway GPRS Support Node
GPRS General Packet Radio System
GTP GPRS Tunneling Protocol
GTP-U GTP User
G-PDU GTP Protocol Data Unit
HeNB Home E-UTRAN Node B
HeNB GW Home eNB Gateway
IP Internet Protocol
IPFIX IP Flow Information Export
IMSI International Mobile Subscriber Identity
MBMS Multimedia Broadcast Multicast Service
OWAMP One-Way Active Measurement Protocol
QoS Quality of Service
PCP Priority Codepoint
PGW Packet Gateway
PM Performance Monitoring
RANAP Radio Access Network Application Protocol
RNC Radio Network Controller
SCTP Stream Control Transmission Protocol
SGSN Serving GPRS Support Node
SGW Serving Gateway
SN Sequence Number
TEID Tunnel Endpoint Identifier
TCP Transmission Control Protocol
TWAMP Two-Way Active Measurement Protocol
UDP User Datagram Protocol
UL Uplink
WLAN Wireless Local Area Network The following terminology and definitions are used herein:

GTP-U node: A device having a processor, storage devices, I/O interfaces, and the like supporting one or more GTP-U endpoints, A GTP-U node can be an eNB, HeNB, HeNB GW, SGW, PGW, SGSN, GGSN, RNC, MBMS GW, WLAN AC or a proxy, for example.

GTP-U endpoint: A UDP/IP endpoint identified with an IP address and a UDP port number, e.g., port 2152. The GTP-U endpoint is responsible for receiving and/or sending G-PDUs and GTP-U signaling messages over one or more GTP-U tunnels.

GTP-U tunnel endpoint: A tunnel endpoint is identified with a TEID, an IP address and a UDP port number, e.g., usually port 2152.

TEID: A tunnel endpoint identifier (TEID) unambiguously identifies a unicast tunnel endpoint or multicast tunnel endpoint in the receiving GTP-U endpoint. TEID=0 is reserved for GTP-U signaling messages.

G-PDU: A GTP user plane message, which carries the original user packet. A G-PDU usually includes a GTP-U header, zero or more GTP-U extension headers and a user IP packet.

PM-capable GTP-U sender: A GTP-U endpoint responsible to forward and encapsulate the user packet into a G-PDU with a sequence number and exit time stamp. In the 2-point PM collection process, the PM-capable GTP-U sender is also responsible to generate G-PDU packet information and statistics, and export G-PDU performance monitoring (PM) records to the GTP-U PM collector. The PM-capable GTP-U sender is referred to herein as the GTP-U sender in this document.

PM-capable GTP-U receiver: A GTP-U endpoint responsible for receiving the G-PDU, tag it with an arrival time stamp, when necessary, and de-capsulate and forward the user packet towards its destination. The PM-capable GTP-U receiver is also responsible to generate G-PDU packet information and statistics, and export G-PDU performance monitoring (PM) records to the GTP-U PM collector. The PM-capable GTP-U receiver is simply referred to herein as the GTP-U receiver.

GTP-U PM collector: A device or function responsible for receiving and collecting the G-PDU performance monitoring records from one or more GTP-U nodes and produce performance metrics and reports for each tunnel or user connection.

G-PDU performance monitoring (PM) record: A G-PDU performance monitoring record is a message that contains G-PDU performance data like G-PDU packet information or GTP-U tunnel performance metrics and statistics about one or more G-PDUs for a specific GTP-U tunnel that was observed at the sending or receiving GTP-U tunnel endpoint.

A unicast user connection or bearer has one or more pairs of GTP-U unicast tunnels for point-to-point transmission in the uplink and downlink directions. A multicast user connection or bearer has a GTP-U multicast tunnel for point-to-multipoint transmission in the downlink direction. Multicast GTP-U tunnels are intended for Multimedia Broadcast Multicast Service (MBMS) or Evolved Multimedia Broadcast Multicast Service (eMBMS).

A GTP-U node can be an eNB, Home eNB (HeNB), SGW, PGW, MBMS GW, HeNB GW, RNC, SGSN or GGSN, WLAN AC or proxy.

Figure 3:
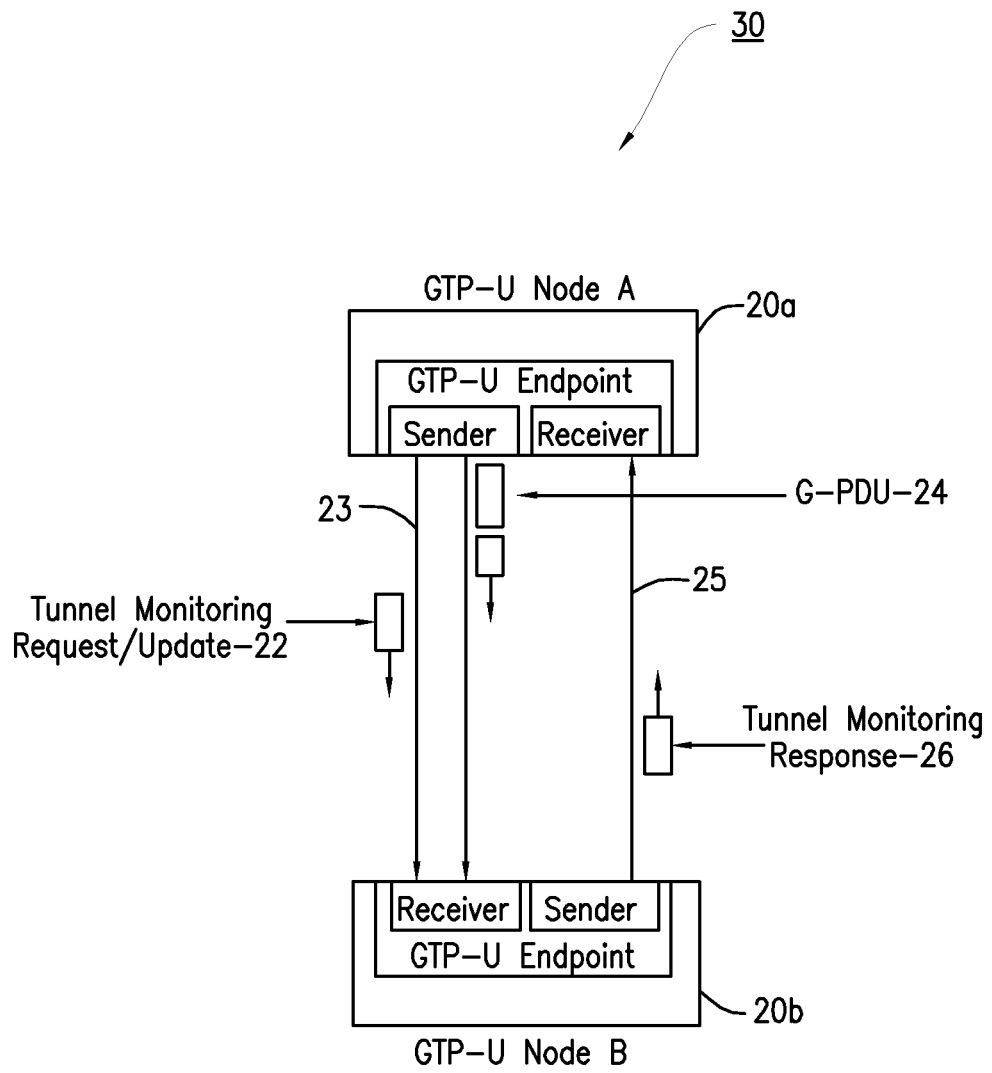
FIG. 3 is a diagram of a system for enabling collection of end-to-end performance information for GTP-U tunnels established between GTP-U nodes according to principles of the present invention.
Figure 4:
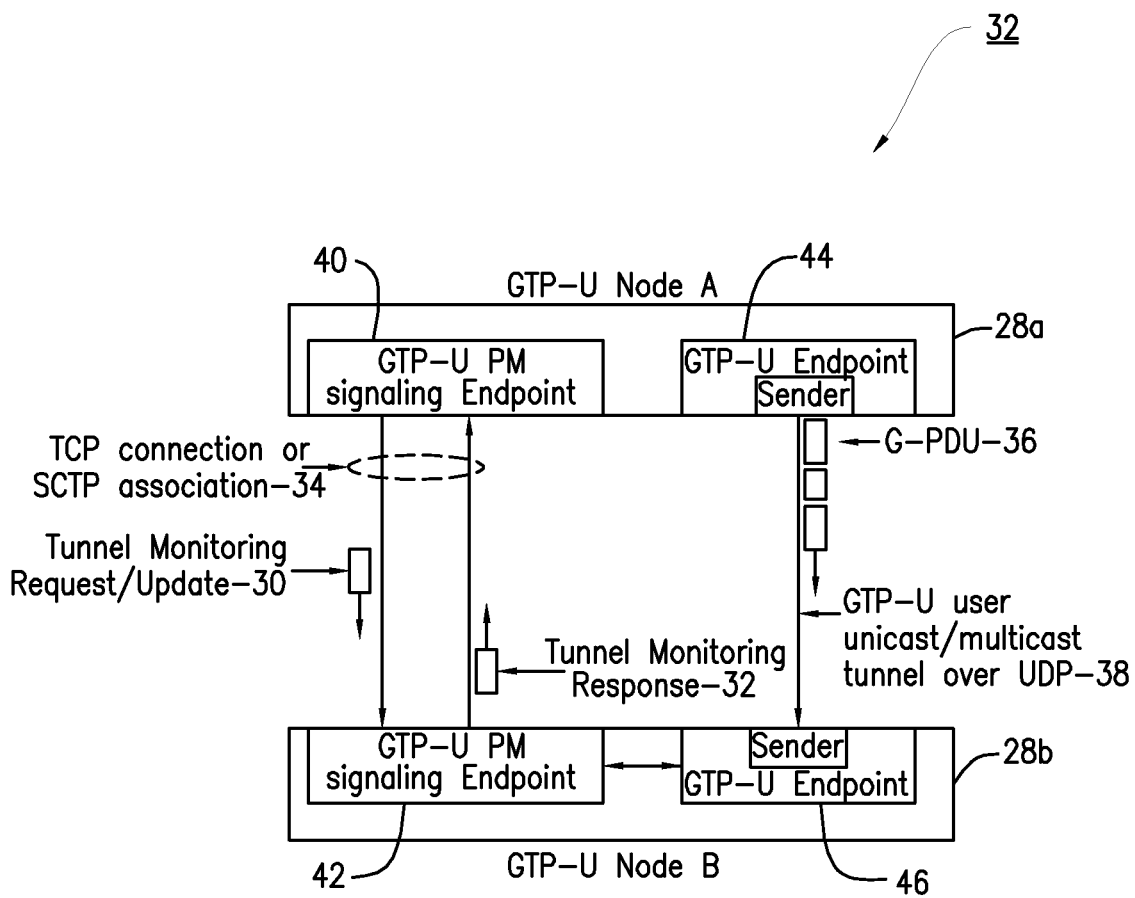
FIG. 4 is a diagram of a system for enabling collection of end-to-end performance information for GTP-U tunnels established between GTP-U nodes according to principles of the present invention.

Referring now to FIG. 3, there is shown an exemplary GPRS 30 which includes a GTP-U node 20a and a GTP-U node 20b (referred to collectively herein as "GTP-U nodes 20"). Each GTP-U node 20 is a sender and receiver of G-PDUs. In FIG. 3, a tunnel monitoring request/update 22 is sent from a transmitting node 20a to a receiving node 20b via a UDP link 23. A tunnel monitoring response 26 is sent from the receiving node 20b to the transmitting node 20a via a UDP link 25. Referring to FIG. 4, there is shown an exemplary GPRS 32 that includes a GTP-U node 28a and a GTP-U node 28b (referred to collectively herein as "GTP-U nodes 28"). In FIG. 4, a tunnel monitoring request 30 is sent from the transmitting node 28a to the receiving node 28b via a control channel 34 that may be a TCP or SCTP connection 34. A tunnel monitoring response 32 is sent over the control channel 34 from the receiving node 28b to the transmitting node 28a. G-PDUs 36 are transmitted over a separate channel such as a UDP channel 38. A difference between the embodiments of FIG. 3 and FIG. 4 is the manner in which identification of a tunnel node to be monitored is made. In the embodiment of FIG. 3, tunnel identification is performed in a data mode, whereas in the embodiment of FIG. 4, tunnel identification is performed in a control mode. Thus, each GTP-U node in FIG. 4 comprises signaling endpoints 40 and 42, and also comprises GTP-U endpoints 44 and 46. FIG. 3 shows that the control messages are exchanged in GTP-U signaling messages and transmitted over the network 18 using a high priority IP quality of service or DSCP. FIG. 4 shows that the control messages are exchanged over a separate control protocol running over a TCP connection or SCTP association, whereas FIG. 3 shows that the control messages and the data are both transmitted over a UDP connection. TCP and SCTP support reliable transport.

More specifically, in the data mode, the GTP-U sender locally decides when GTP-U performance monitoring capability begins and it is up to the GTP-U receiver to detect when GTP-U performance monitoring capability is required based on information present in the incoming G-PDUs. Such information may be a sequence number combined with a time stamp. The GTP-U receiver stops monitoring a GTP-U tunnel when incoming G-PDUs no longer include the required information. In data mode, the operator remotely accesses the GTP-U receiver by way of a management interface to configure the behavior of the GTP-U performance monitoring capability, such as by specifying a G-PDU packet loss threshold. The operator may also enable or disable the GTP-U performance monitoring capability at the GTP-U sender for a specific user bearer using the international mobile subscriber identity (IMSI) of a UE.

In the control mode, the GTP-U sender 42 via a control function of the GTP-U sender 42, or an external control unit with a control function operating in conjunction with the GTP-U sender, and GTP-U receiver 44 exchange control messages to agree on the GTP-U performance monitoring capability for a specific GTP-U tunnel before the actual monitoring of the G-PDUs begins. When an external control unit is employed, the control unit may be responsible for signaling, trace and network management functions. The activation is prompted by a request message originating from the GTP-U sender 42 followed by a response message originating from the GTP-U receiver 44. The request message includes the TEID to monitor and may also include additional information about the expected performance monitoring behavior at the GTP-U receiver 44. This additional information may include a subscriber reference identifier generated by the GTP-U sender or network management node, a G-PDU loss threshold, initial sequence number, last sequence number or number of packets to monitor, DSCP, PCP, initial time to live and performance monitoring collection method. This information can also be provided in a G-PDU performance record sent to a G-PDU performance monitor collector.

Figure 5:
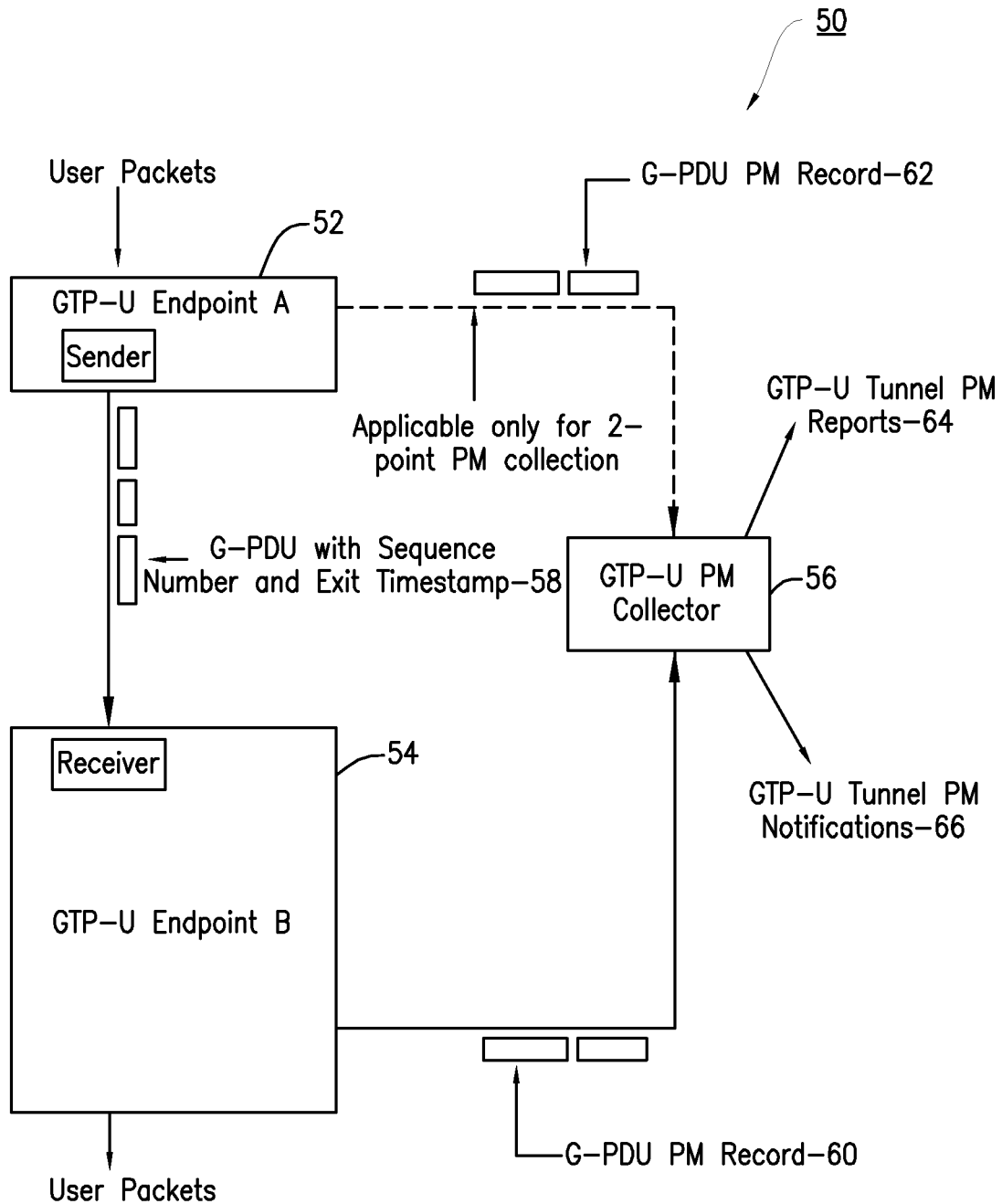
FIG. 5 is a diagram of a system for enabling collection of end-to-end performance information for GTP-U tunnels established between GTP-U nodes according to principles of the present invention.

FIG. 5 is a block diagram of an exemplary system 50 that illustrates a collection process for collecting data derived from performance monitoring of a tunnel. The GTP-U sender node 52 encapsulates each user packet into a G-PDU as defined by the applicable standard, such as TS 29.281 or TS 29.274. When GTP-U performance monitoring is activated for a tunnel, the GTP-U sender initiates a sequence counter for the corresponding outgoing GTP-U tunnel and includes a sequence number for each outgoing G-PDU. The GTP-U sender node 52 sends a G-PDU 58 with the sequence number and an exit time stamp to a GTP-U receiver node 54.

Thus, the GTP-U sender maintains a separate sequence number for each monitored GTP-U tunnel. The sequence number may be set to an initial value of zero upon the transmission of the first monitored G-PDU on the tunnel. The sequence number can be incremented by one for each subsequent G-PDU transmission on the tunnel. The sequence number can be carried in the GTP-U header as defined by the applicable standard. The sequence number can also be carried in a GTP-U extension header specifically reserved for the purpose of performance monitoring. If the sequence number is carried in the sequence number field defined in the GTP-U header, a reordering function at the GTP-U receiver node 54 may be disabled if not needed. This is because the sequence number defined in the current 3GPP specifications is intended to trigger the reordering of out of sequence packets at the remote peer when in-sequence delivery is required. The GTP-U sender 52 also generates an exit time stamp for each outgoing G-PDU.

The GTP-U receiver node 44 receives and encapsulates the user packet from each G-PDU received from the GTP-U sender node 42. When GTP-U performance monitoring is activated for a tunnel, the GTP-U receiver generates an arrival time for each incoming G-PDU and may include the arrival time stamp in the G-PDU performance data. The GTP-U receiver 54 may transfer the following G-PDU performance data in GTP-U performance monitoring records to a GTP-U performance monitoring collector 56. The performance data for a group of G-PDUs belonging to a specific tunnel may include, without limitation, one or more of the following:

Sub-IP (e.g. Ethernet) header fields
    Outer and inner IP header fields
    Outer transport (UDP) fields
    Inner transport (UDP, TCP or SCTP) fields when applicable
    Inner ICMP type and code when applicable
    GTP-U header and extension header fields
    Exit timestamp
    Arrival timestamp when applicable
    Associated TEID for the opposite direction of a unicast bearer
    GTP-U node or interface identify or host name
    User (UE) identity when known e.g. IMSI
    Subscriber reference identifier when applicable
    GTP-U sequence number of the first received G-PDU in the group
    GTP-U sequence number of the last received G-PDU in the group
    The arrival timestamp of the first received G-PDU in the group The arrival timestamp of the last received G-PDU in the group
Number of received G-PDUs
Number of received outer IP or Ethernet octets
Number of lost G-PDUs
Number of G-PDUs discarded locally
Lost G-PDU ratio
Number of duplicated G-PDUs
Duplicated G-PDU ratio
Number of reordered G-PDUs
Reordered G-PDU ratio
Minimum G-PDU delay and delay variation
Maximum G-PDU delay and delay variation
Median G-PDU delay and delay variation
Minimum G-PDU size
Maximum G-PDU size
Minimum TTL
Maximum TTL
Has DSCP changed
Has ECN changed
Has PCP changed
Number of received ICMP packets
Number of received user UDP packets
Number of received user SCTP packets
Number of received user TCP packets with SYC, FIN, RST, PSH, ACK and URG flags
Minimum TCP window size
Maximum TCP window Size At least some of the above-listed data is sent to the GTP-U performance monitor collector 56 in the form of performance monitoring records. The performance monitoring records 60 are transmitted to the performance monitor collector 56 when available or according to a schedule. The GTP-U performance monitor collector 56 may produce and provide GTP-U tunnel performance monitoring reports to a system administrator. In addition to receiving performance monitor data from the GTP-U receiver 54, the GTP-U performance monitor collector 56 may also receive G-PDU performance monitoring data 62 from the GTP-U sender 52. In some embodiments, the GTP-U performance monitor collector 56 may be separate from, or incorporated into, either the GTP-U sender 52 or the GTP-U receiver 54.

A G-PDU performance record contains G-PDU packet information and/or GTP-U tunnel performance metrics, which can include statistical performance data about one or more G-PDUs for a specific GTP-U tunnel. Data collection by the GTP-U performance monitor collector 46 can be obtained by a one-point GTP-U performance monitor collection method or a two-point GTP-U performance monitor collection method. In the one-point GTP-U performance monitor collection process, the data collection is only performed at the GTP-U receiver node 44 for each unidirectional tunnel. For a bidirectional bearer, when GTP-U performance monitoring is activated in the both the downlink in the uplink directions, the GTP-U performance data is collected at both endpoints where each endpoint acts as a GTP-U receiver. In the one-point GTP-U performance monitor collection process, statistical analysis may be performed over a finite number of G-PDUs for a given GTP-U tunnel. The analysis may be performed in the GTP-U receiver unit 54 or at the GTP-U performance monitor collector 56. Therefore, the G-PDU performance records may include raw G-PDU packet information and/or GTP-U tunnel statistical performance metrics.

In the two-point GTP-U performance monitoring collection process, the data collection is done at the GTP-U sender 52 and at the GTP-U receiver 54 for each unidirectional tunnel. Thus, in the two-point GTP-U performance monitoring collection process, G-PDU performance monitoring records may be provided to the GTP-U performance monitor collector 46 from both the sending and receiving GTP-U units 52 and 54, respectively. The statistical metrics of a group of G-PDUs may be calculated after a configurable number of G-PDUs are received or after a configurable time period has elapsed.

A GTP-U performance record 60, 62 may be carried over TCP or SCTP transport protocol. A performance record can also be carried over UDP, including the use of GTP-U signaling messages to carry performance monitoring records back to the GTP-U node acting as the GTP-U sender node 42.

The GTP-U performance monitor collector 56 can be a dedicated device or a management node. It can also be an eNB, Home eNB (HeNB), SGW, PGW, MBMS GW, HeNB GW, RNC, SGSN, GGSN, WLAN AC or proxy. The GTP-U performance monitor collector collects the G-PDU performance records from one or more GTP-U nodes and correlates the records using the GTP-U tunnel characteristics. The GTP-U performance monitor collector is also responsible for correlating the records for unicast bearers for both uplink and downlink directions when applicable. The GTP-U performance monitor collector may also perform the statistical analysis and produce the performance metrics and reports 64 for each unicast or multicast tunnel. The performance report includes statistical properties for a specific tunnel or a specific user bearer, which may include a pair of tunnels.

When a performance degradation has been detected for a specific tunnel or user bearer, the GTP-U performance monitor collector 56 can be configured to send a notification or alarm 66 to a monitoring device such as an SNMP trap listener.

Figure 6:
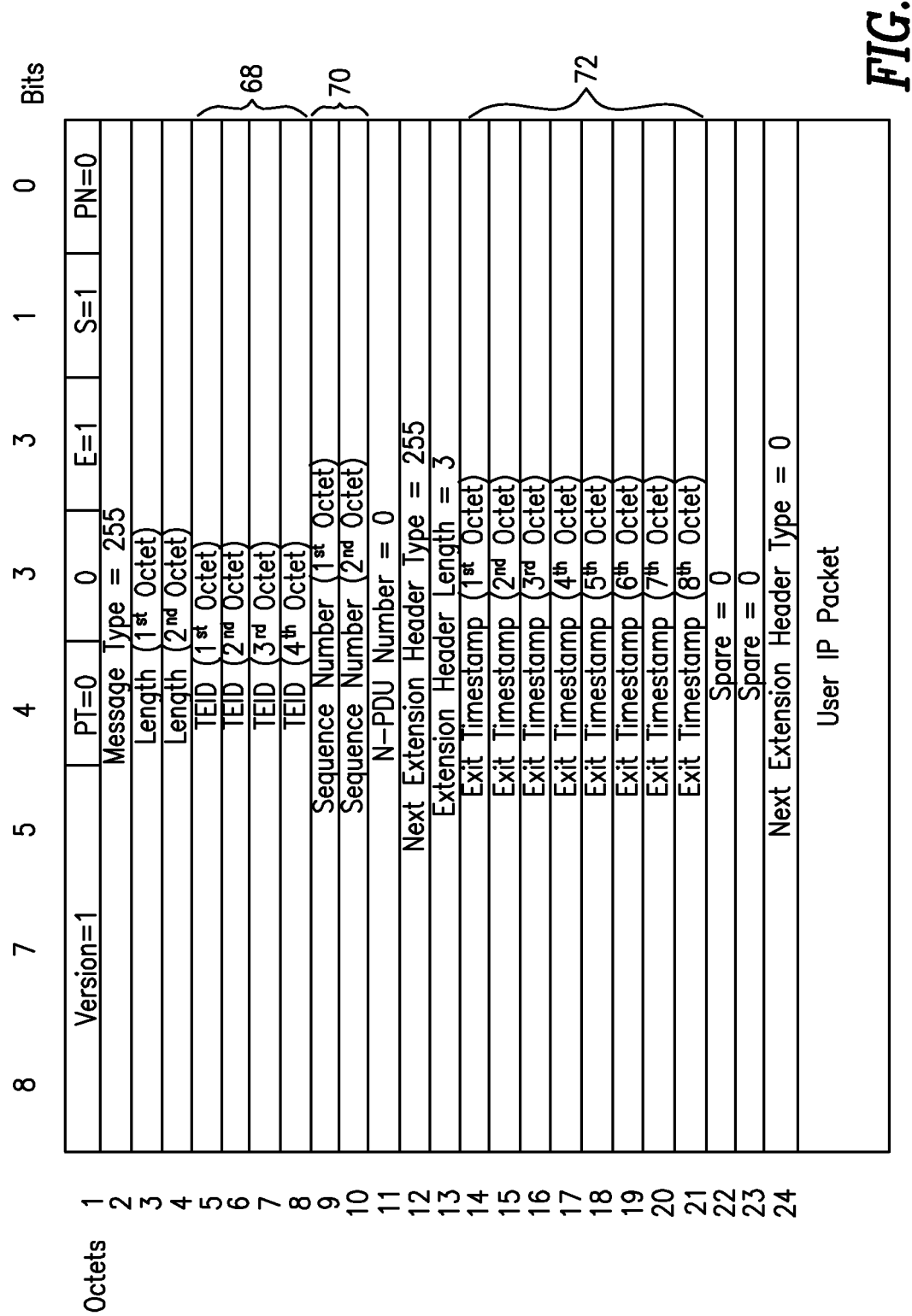
FIG. 6 illustrates one exemplary format of a G-PDU containing a sequence number, timestamp and TEID.

FIG. 6 illustrates one exemplary format of a G-PDU containing a sequence number, exit timestamp and TEID. The TEID 68 occupies 4 octets, the sequence number 70 occupies 2 octets and the exit timestamp occupies 8 octets 72. The Sequence Number flag (S) indicates the presence of a meaningful value of the sequence number field. When it is set to '1', the sequence number field is present, and should be interpreted. The Extension Header flag (E) indicates the presence of a meaningful value of the GTP-U extension header. When it is set to '1', an extension header is present, and should be interpreted. In the example of FIG. 6, the extension header includes a Next Extension Header Type equals to 255 specifying the presence of an exit timestamp in the GTP-U extension header. Other values for the Next Extension Header Type can be selected. Other implementations of the G-PDU may be envisioned.

Figure 7:
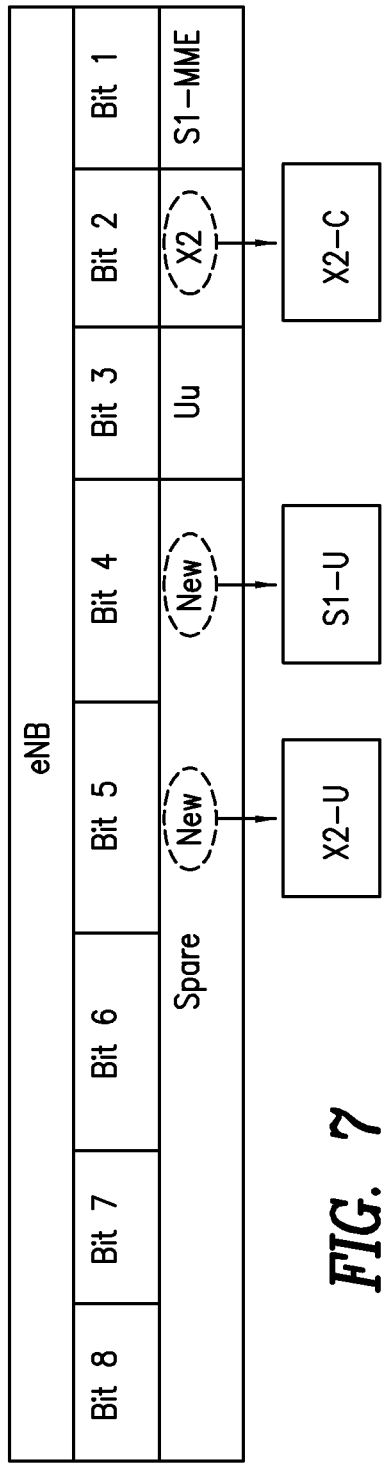
FIG. 7 is one exemplary format of a request message to activate tunnel monitoring on an eNodeB (eNB)

FIG. 7 shows one exemplary format of a request message to activate tunnel monitoring on an eNB. The request message is sent from a mobility management entity (MME) to an eNB. A logical one in bit 4 signals the eNB to activate monitoring of a GTP-U tunnel on the S1-U interface between the eNB and the SGW. A logical 1 in bit 2 signals the eNB to activate monitoring of a GTP-U control signal tunnel on an X2-C interface between the eNB and another eNB. A logical 1 in bit 6 signals the eNB to activate monitoring of a GTP-U data signal tunnel on an X2-U interface between the eNB and another eNB.

Figure 8:
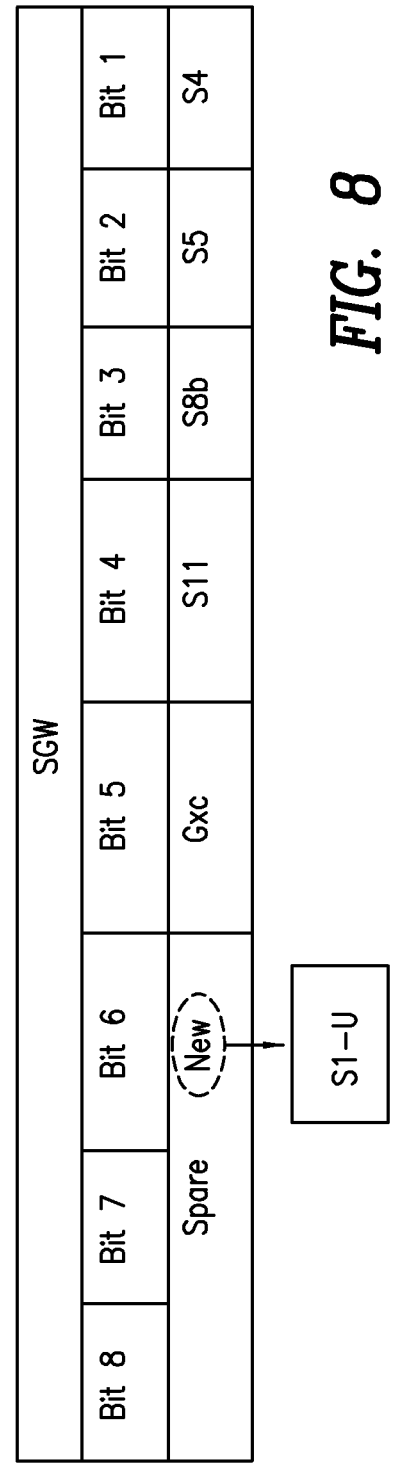
FIG. 8 is one exemplary format of a request message to activate tunnel monitoring on an serving gateway (SGW)

FIG. 8 shows one exemplary format of a request message to activate tunnel monitoring on an SGW. The request message is sent from the MME to the SGW. A logical 1 in bit 6 signals the SGW to activate monitoring of a GTP-U tunnel on the S1U interface between the SGW and an eNB.

Figure 9:
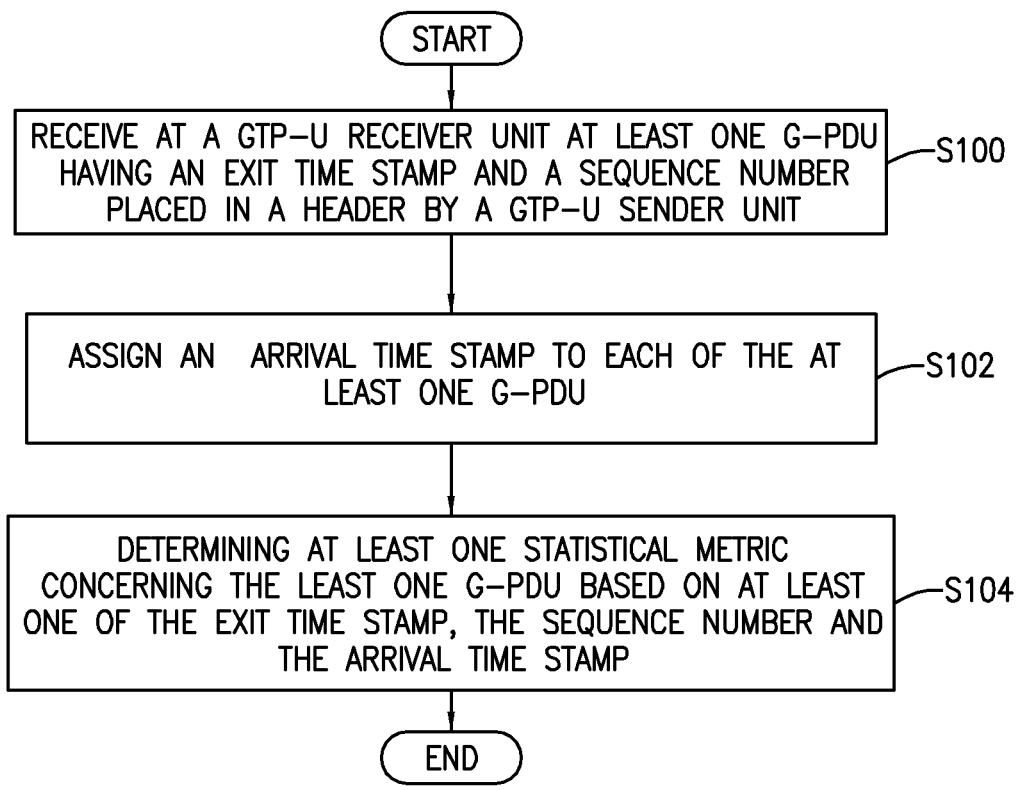
FIG. 9 is a flowchart of an exemplary process for determining at least one statistical metric concerning a G-PDU for a particular tunnel.

FIG. 9 is a flowchart of an exemplary process for determining at least one statistical metric concerning a G-PDU for a particular tunnel. The GTP-U receiver unit 54 receives from a GTP-U sender unit 54 at least one G-PDU having an exit time stamp and a sequence number placed in a header by a GTP-U sender unit 52 (block S100). An arrival timestamp is assigned by the GTP-U receiver unit 54 to a received G-PDU (block S102). At least one statistical metric concerning the G-PDU is determined at the GTP-U receiver unit 54 or the GTP-U performance monitor collector 56 based on at least one of the exit timestamp, sequence number and the arrival timestamp (block S104).

Figure 10:
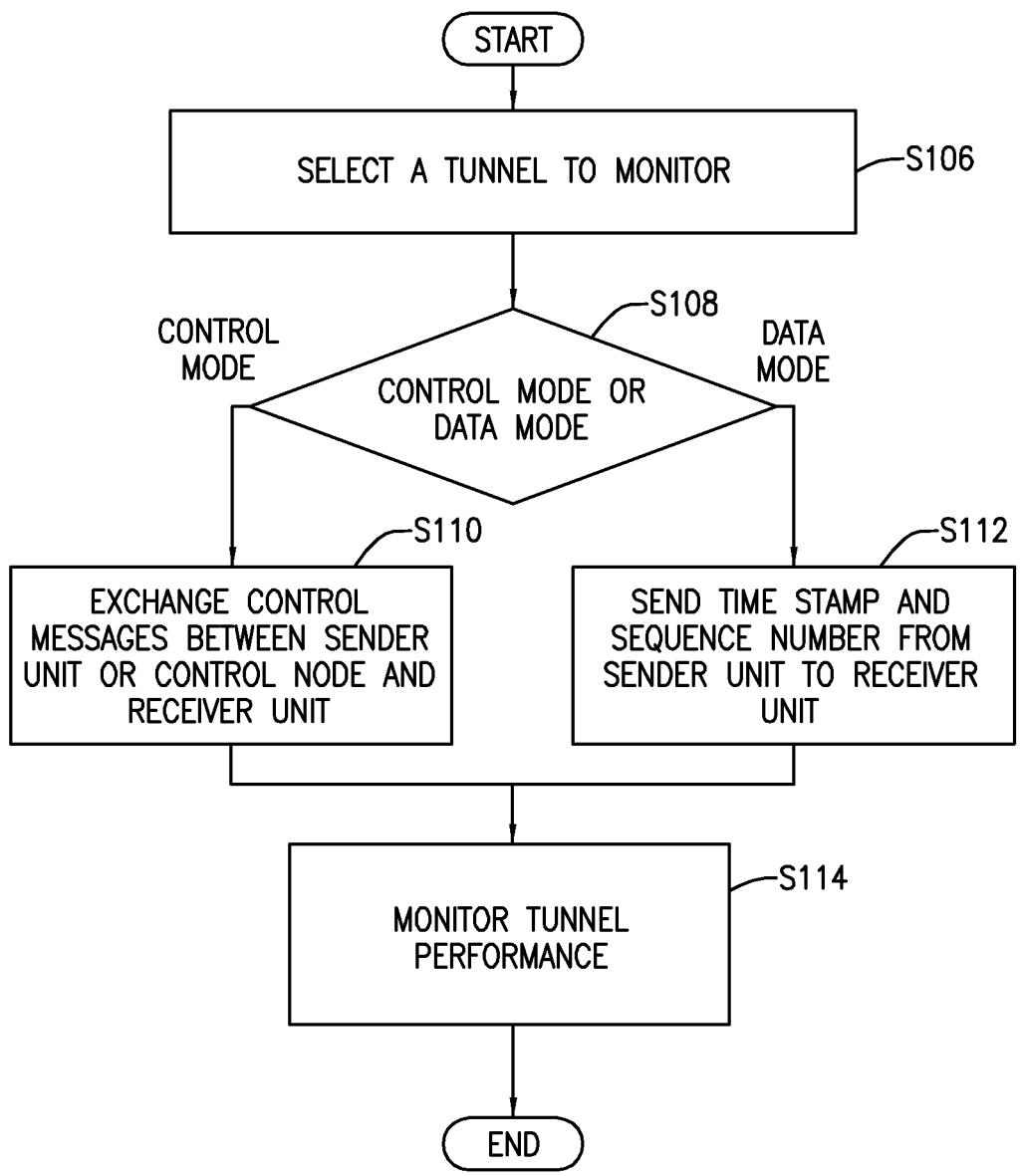
FIG. 10 is a flowchart of an exemplary process for initiating tunnel performance monitoring.

FIG. 10 is a flowchart of an exemplary process for initiating tunnel performance monitoring. A tunnel to monitor is selected (block S106), for example, by a system administrator. A determination is made by the system administrator whether the initiation will be performed using a control mode or a data mode (block S108). If the control mode is selected, control messages, which may include a TEID and subscriber reference identifier, are exchanged between the sender unit or a control node, operating in conjunction with the sender unit, and the receiver unit (block S110). If the data mode is selected, a timestamp and a sequence number is sent from the sender unit to the receiver unit (block S112). Upon initiation of the monitoring, a tunnel performance is monitored (block S114).

The principles of embodiments described above are applicable to Wi-Fi systems that include wireless access points. In particular, a Wi-Fi system that uses control and provisioning of wireless access points (CAPWAP) protocol may be configured to enable collection of end-to-end performance information.

Carrier-grade WLAN (Wireless Local Area Network) networks are made of Access Points (APs) and Access Controllers (ACs). The APs are distributed small-cell nodes responsible for providing 802.11 radio services to users and subscribers in outdoor and/or in-door Wi-Fi coverage areas. The APs communicate with one or more Access Controllers (ACs) over a backhaul network. The backhaul network can be an IPv4 network, an IPv6 network, an Ethernet LAN network, a wireless mesh network or any other mix of wired or wireless L2 technology, including very-high bit digital subscriber lines, asymmetric digital subscriber lines (VDSL/ADSL) and cable modems.

The AC manages the control and data traffic from a group of APs. The AC improves Wi-Fi services delivery in large venues and enterprises, as well as small to medium sized businesses and 3G/4G offload scenarios. The AC provides a single point of management and increased security by creating secure connections to each AP. The communication protocol between the AP and AC is the CAPWAP protocol. The CAPWAP protocol is composed of two distinct UDP/IP flows: the CAPWAP control channel and the CAPWAP data channel.

Figure 11:
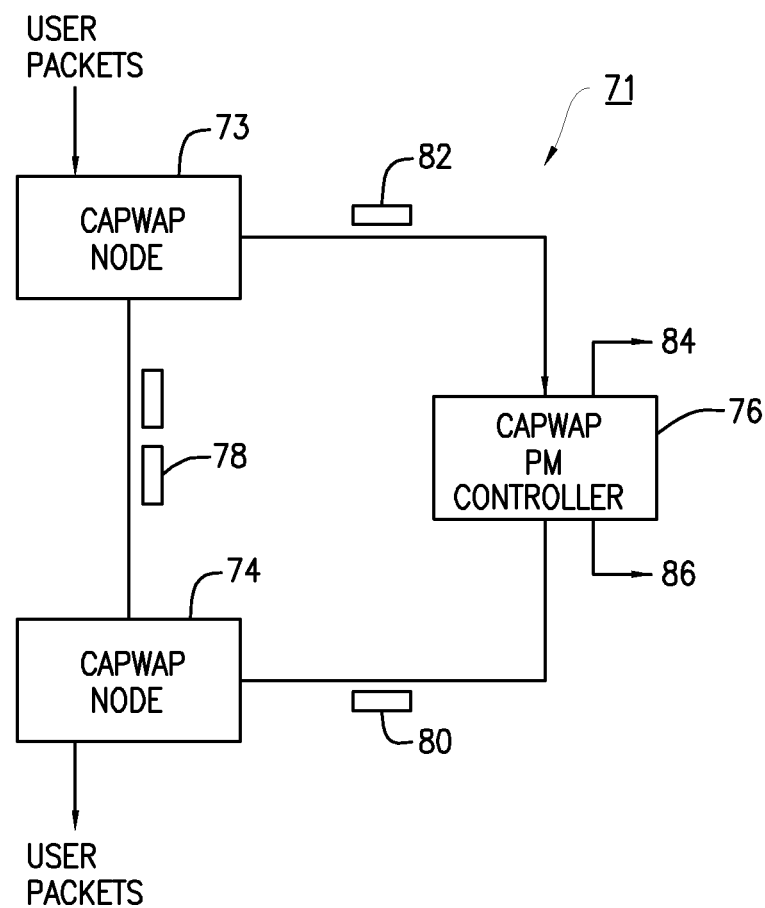
FIG. 11 is a diagram of an exemplary WiFi system for enabling collection of end-to-end performance information for data channels established between control and provisioning of wireless access points (CAPWAP) nodes according to principles of the present invention.

FIG. 11 is a block diagram of an exemplary system 71 that illustrates a collection process for collecting data derived from performance monitoring a CAPWAP data channel and a Wi-Fi system. A Wi-Fi data sender node 73, such as an access controller, encapsulates data packets 78 according to the CAPWAP protocol. User packets are received by the data sender node 73, processed and sent to a data receiver node 74. The data packets 78 are received by the CAPWAP data receiver node 74, such as an access point. When performance monitoring is activated for a data channel, the access controller 73 initiates a sequence counter for the corresponding data channel and includes a sequence number for each outgoing data packet 78. The node 73 also generates an exit timestamp the stamp each outgoing data packets 78 with a time of transmission of the data packet. The data receiver node 74 may also forward the processed user packets onward in the WiFi system.

Thus, the data sender node 73 maintains a separate sequence number for each monitored data channel. The sequence number may be set to an initial value of zero upon the transmission of the first monitored data packet on the data channel. The sequence number can be incremented by one for each subsequent transmission on the data channel.

The data receiver node 74 receives the data packets 78 from the data sender node 73. When performance monitoring is activated for a data channel, the data receiver node 74 generates an arrival time for each incoming data packet. The data receiver node 74 transfers data channel performance data and monitoring records 80 that are transmitted to a CAPWAP PM collector 76. Also, performance records 82 from the data sender node 73 may be sent to the collector 76. The collector 76 outputs data channel performance monitoring reports 84 and data channel performance monitoring notifications 86. Thus, operation of the system 71 is similar to operation of the system 50.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A system for enabling collection of end-to-end performance information for individual general packet radio system tunneling protocol user, GTP-U, tunnels established between GTP-U nodes, the system comprising:
   a GTP-U sender node configured to:
      provide a sequence number for each of a plurality of GTP protocol data units, G-PDU, to enable determination of a first set of one-way performance data of a GTP-U tunnel to be monitored;
      exchange tunnel endpoint identifiers, TEID, with a GTP-U receiver node to select one GTP-U tunnel to be monitored at a time to enable selective detection of performance of individual GTP-U tunnels; and send a request message to the GTP-U receiver node to configure an expected GTP-U performance monitoring behavior, the request message selectively specifying whether a performance monitoring, PM, collection method is one of a one point GTP-U collection method and a two point GTP-U collection method to indicate whether the GTP-U receiver node is an end node for collecting performance monitoring data.

2. The system of claim 1, wherein the GTP-U sender node is further configured to provide an exit time stamp for a G-PDU, to enable determination of a second set of one-way performance data of the GTP-U tunnel to be monitored.

3. The system of claim 2, wherein the second set of one-way performance data includes at least one of one-way packet delay and packet delay variation statistics.

4. The system of claim 1, wherein the first set of one-way performance data includes at least one of one-way packet loss, packet mis-ordering, and packet duplicate statistics.

5. The system of claim 1, wherein the GTP-U sender node is further configured to initiate a sequence counter to assign a sequence number to each outgoing G-PDU for the GTP-U tunnel to be monitored.

6. The system of claim 5, wherein the sequence number intended for performance monitoring is included in a GTP-U header.

7. The system of claim 2, wherein the exit time stamp intended for performance monitoring is included in one of a GTP-U header and GTP-U extension header.

8. The system of claim 2, further comprising:
a GTP-U performance monitor, PM, collector in communication with the GTP-U sender node, the GTP-U PM collector being configured to collect PM data from the GTP-U sender node, the PM data including the sequence number and exit time stamp of the G-PDU.

9. The system of claim 1, wherein the request message further includes at least one of a subscriber reference identifier, packet loss threshold, an initial sequence number, a last sequence number, a number of packets to monitor, diffserv code point, DSCP, priority code point, PCP, and initial time-to-live, TTL.

10. The system of claim 1, wherein the GTP-U sender node is further configured to receive a response message from the GTP-U receiver node at an end of the GTP-U tunnel to be monitored.

11. The system of Claim 1, further comprising a control function, the control function being configured to receive a response message from the GTP-U receiver node at an end of the GTP-U tunnel to be monitored.

12. The system of claim 1, wherein the GTP-U sender node is further configured to activate tunnel monitoring in one of a control mode and a data mode, wherein in the control mode, the GTP-U sender node is further configured to exchange control messages with the GTP-U receiver node at an end of the GTP-U tunnel to be monitored, and wherein in the data mode, the GTP-U sender node is further configured to signal a start of performance monitoring by including at least one of a sequence number and a time stamp in a G-PDU.

13. The system of claim 12, wherein in the data mode, the GTP-U sender node is further configured to signal a termination of performance monitoring by no longer including the at least one of the sequence number and the time stamp in a G-PDU.

14. The system of claim 2, further comprising:
a GTP-U receiver node configured to receive the sequence number and the exit time stamp of the G-PDU and to compute an arrival time stamp indicating arrival of the G-PDU.

15. A system for enabling collection of end-to-end performance information for individual general packet radio system tunneling protocol user, GTP-U, tunnels established between GTP-U nodes, the system comprising:
a GTP-U receiver node configured to:
receive a sequence number for each of a plurality of GTP protocol data units, G-PDU;
exchange tunnel endpoint identifiers, TEID, with a GTP-U sender node to select one GTP-U tunnel to be monitored at a time to enable selective detection of performance of individual GTP-U tunnels; and
send a request message to the GTP-U receiver node to configure an expected GTP-U performance monitoring behavior, the request message selectively specifying whether a performance monitoring, PM, collection method is one of a one point GTP-U collection method and a two point GTP-U collection method to indicate whether the GTP-U receiver node is an end node for collecting performance monitoring data.

16. The system of claim 15, wherein the GTP-U receiver node is further configured to receive an exit time stamp, and to assign an arrival time stamp to each received G-PDU.

17. The system of claim 15, wherein the GTP-U receiver is further configured to trigger a notification of performance degradation based on a statistical analysis of the collected PM data.

18. The system of claim 15, further comprising:
a GTP-U performance monitor, PM, collector in communication with the GTP-U receiver node, the GTP-U PM collector configured to collect PM data from the GTP-U receiver node, the PM data including the sequence number, an exit time stamp and an arrival time stamp.

19. The system of claim 18, wherein the GTP-U PM collector is further configured to process data received from the GTP-U receiver node concerning performance of a GTP-U tunnel being monitored, the data including one of one-way packet delay, one-way packet delay variation, one-way packet loss, one-way packet mis-ordering, and the one-way packet duplicate statistics produced by the GTP-U receiver node.

20. The system of claim 18, wherein the GTP-U PM collector is further configured to trigger a notification of performance degradation based on a statistical analysis of the collected PM data.

21. A method of collecting end-to-end performance data for individual general packet radio system tunneling protocol user, GTP-U, tunnels established between GTP-U nodes, the method comprising:
exchanging tunnel endpoint identifiers between a GTP-U receiver unit and a GTP-U sender unit to select one GTP-U tunnel to monitor at a time to enable selective detection of performance of individual GTP-U tunnels;
receiving at the GTP-U receiver unit at least one GTP protocol data unit, G-PDU, having an exit time stamp and a sequence number placed in a header by the GTP-U sender unit;
sending a request message to the GTP-U receiver node to configure an expected GTP-U performance monitoring behavior, the request message selectively specifying whether a performance monitoring, PM, collection method is one of a one point GTP-U collection method and a two point GTP-U collection method to indicate whether the GTP-U receiver node is an end node for collecting performance monitoring data;

assigning an arrival time stamp to each of the at least one G-PDU; and determining at least one statistical metric concerning the at least one G-PDU based on at least one of the exit time stamp, the sequence number and the arrival time stamp.

22. The method of claim 21, wherein the at least one statistical metric includes at least one of a sequence number of a first received G-PDU, a sequence number of a last received G-PDU, an arrival time stamp of the first received G-PDU, an arrival time stamp of the last received G-PDU, and a number of received G-PDUs.

23. A system for enabling collection of end-to-end performance information for Control and Provisioning of Wireless Access Points, CAPWAP, protocol data channels established between CAPWAP nodes, the system comprising:

a CAPWAP data sender configured to:
provide a sequence number for a CAPWAP data packet to enable determination of a first set of one-way performance data of a CAPWAP data channel to be monitored;
exchange endpoint identifiers with a CAPWAP receiver to select one CAPWAP data channel to be monitored at a time to enable selective detection of performance of individual CAPWAP data channels;
send a request message to the CAPWAP receiver to configure an expected performance monitoring behavior, the request message selectively specifying whether a performance monitoring, PM, collection method is one of a one point GTP-U collection method and a two point GTP-U collection method to indicate whether the GTP-U receiver node is an end node for collecting performance monitoring data.

24. The system of claim 23, wherein the CAPWAP data sender is further configured to provide an exit time stamp for a CAPWAP data packet to enable determination of a second set of one-way performance data of the CAPWAP data channel to be monitored.

* * * * *